United States Patent [19]

Tomlinson, Jr. et al.

[11] Patent Number: 5,569,911
[45] Date of Patent: Oct. 29, 1996

[54] FIBER OPTIC SYSTEM FOR REMOTE FLUORESCENT SENSING USING EXCITATION AND RETURN FIBERS

[75] Inventors: Harold W. Tomlinson, Jr., Scotia; Sandra F. Feldman, Schenectady; Emily Y. Shu, Niskayuna, all of N.Y.

[73] Assignee: General Electric Company, Schenectady, N.Y.

[21] Appl. No.: 597,318

[22] Filed: Feb. 6, 1996

Related U.S. Application Data

[63] Continuation of Ser. No. 350,237, Dec. 6, 1994, abandoned, which is a continuation of Ser. No. 95,576, Jul. 19, 1993, abandoned.

[51] Int. Cl.$^6$ .................................................. H01J 5/16
[52] U.S. Cl. ..................... 250/227.24; 128/633; 385/41
[58] Field of Search .................. 250/227.21, 227.24, 250/227.27, 458.1, 461.1, 459.1; 356/336; 128/664, 665, 666, 633, 634; 73/655, 656, 657; 385/17, 41, 42, 28

[56] References Cited

U.S. PATENT DOCUMENTS

| | | | |
|---|---|---|---|
| 4,336,809 | 6/1982 | Clark | 128/665 |
| 4,652,744 | 3/1987 | Bowers et al. | 250/227.27 |
| 4,837,777 | 6/1989 | Jones et al. | 250/227.21 |
| 4,895,156 | 1/1990 | Schulze | 250/458.1 |
| 4,897,542 | 1/1990 | Dakin et al. | 250/227.21 |
| 5,089,696 | 2/1992 | Turpin | 250/227.21 |
| 5,211,480 | 5/1993 | Thomas et al. | 250/227.21 |
| 5,239,998 | 8/1993 | Krauthamer | 128/633 |

*Primary Examiner*—Que T. Le
*Attorney, Agent, or Firm*—Ann M. Agosti; Marvin Snyder

[57] ABSTRACT

A fiber optic probe system includes a fiber optic probe and a carrier cable coupled to the probe. The carrier cable includes an excitation fiber for receiving excitation light and supplying a portion of the excitation light to the fiber optic probe, a return fiber for receiving detected light from the probe, and a directional coupler coupling the excitation fiber with the return fiber. The directional coupler is situated near an end of the carrier cable which is closest to the probe. A plurality of these fiber optic probes can be multiplexed using a plurality of carrier cables, each cable having a respective excitation fiber for receiving excitation light and supplying the excitation light to a respective one of the plurality of fiber optic probes.

18 Claims, 3 Drawing Sheets

FIBER OPTIC SYSTEM FOR REMOTE FLUORESCENT SENSING USING EXCITATION AND RETURN FIBERS

This application is a Continuation of application Ser. No. 08/350,237 filed Dec. 6, 1994, now abandoned, which is a File Wrapper Continuation of Ser. No. 08/095,576 filed Jul. 19, 1993, now abandoned.

BACKGROUND OF THE INVENTION

1. Field of the Invention

This invention relates generally to the detection of analytes, and, more particularly, to a system using a fiber optic probe for sensing the concentration of an analyte in a fluid situated at a remote location.

2. Description of the Related Art

In a fiber optic based laser induced fluorescence sensor probe, light propagates through an optical fiber (hereinafter "fiber") to an active region. In the active region, evanescent or distal field excitation leads to a fluorescent signal from an analyte outside the fiber. The fluorescent signal propagates back through the fiber and is used to estimate the concentration of the analyte. Typical uses for such probes include detecting hazardous waste, monitoring the contamination of a gas or process stream, and measuring engine temperatures.

The propagating energy field in a fiber induces native fluorescence of the fiber on the path toward the probe. It would be desirable to reduce the level of induced fluorescence and thus reduce background noise. Additionally, it would be desirable to have a compact, portable system with multiple probes which can be used to simultaneously measure the concentrations of various predetermined analytes.

SUMMARY OF THE INVENTION

Accordingly, an object of the invention is to reduce the influence of background fluorescence in a fiber optic probe having a long carrier cable.

Another object of the invention is to multiplex a plurality of fiber optic probes to a single light source and provide for simultaneous analysis of a plurality of analytes.

Briefly, in accordance with one preferred embodiment of the present invention, a fiber optic probe system comprises a fiber optic probe and a carrier cable coupled to the fiber optic probe. The carrier cable includes an excitation fiber for receiving excitation light and supplying a portion of the excitation light to the fiber optic probe, a return fiber for receiving detected light from the probe, and a directional coupler coupling the excitation fiber with the return fiber. The directional coupler is situated near an end of the carrier cable which is closest to the fiber optic probe.

In accordance with another preferred embodiment of the invention, a system for multiplexing fiber optic probes comprises a plurality of fiber optic probes and a plurality of excitation fibers for receiving excitation light. Each one of the plurality of excitation fibers supplies a portion of the excitation light to a respective one of the plurality of fiber optic probes. The system further includes a plurality of return fibers for receiving detected light and a plurality of directional couplers. Each of the directional couplers couples a respective one of the plurality of excitation fibers with a respective one of the plurality of return fibers.

In accordance with another preferred embodiment of the present invention, a method for detecting a plurality of analytes comprises providing excitation light in a plurality of excitation fibers and directionally coupling a portion of the excitation light in each of the plurality of excitation fibers into a respective one of a plurality of fiber optic probes. Fluorescence is detected with the plurality of fiber optic probes, and a portion of the detected fluorescence is directionally coupled from one of the plurality of fiber optic probes to a respective one of a plurality of return fibers.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing, where like numerals represent like components, in which:

DETAILED DESCRIPTION OF PREFERRED EMBODIMENTS OF THE INVENTION

Figure 1:
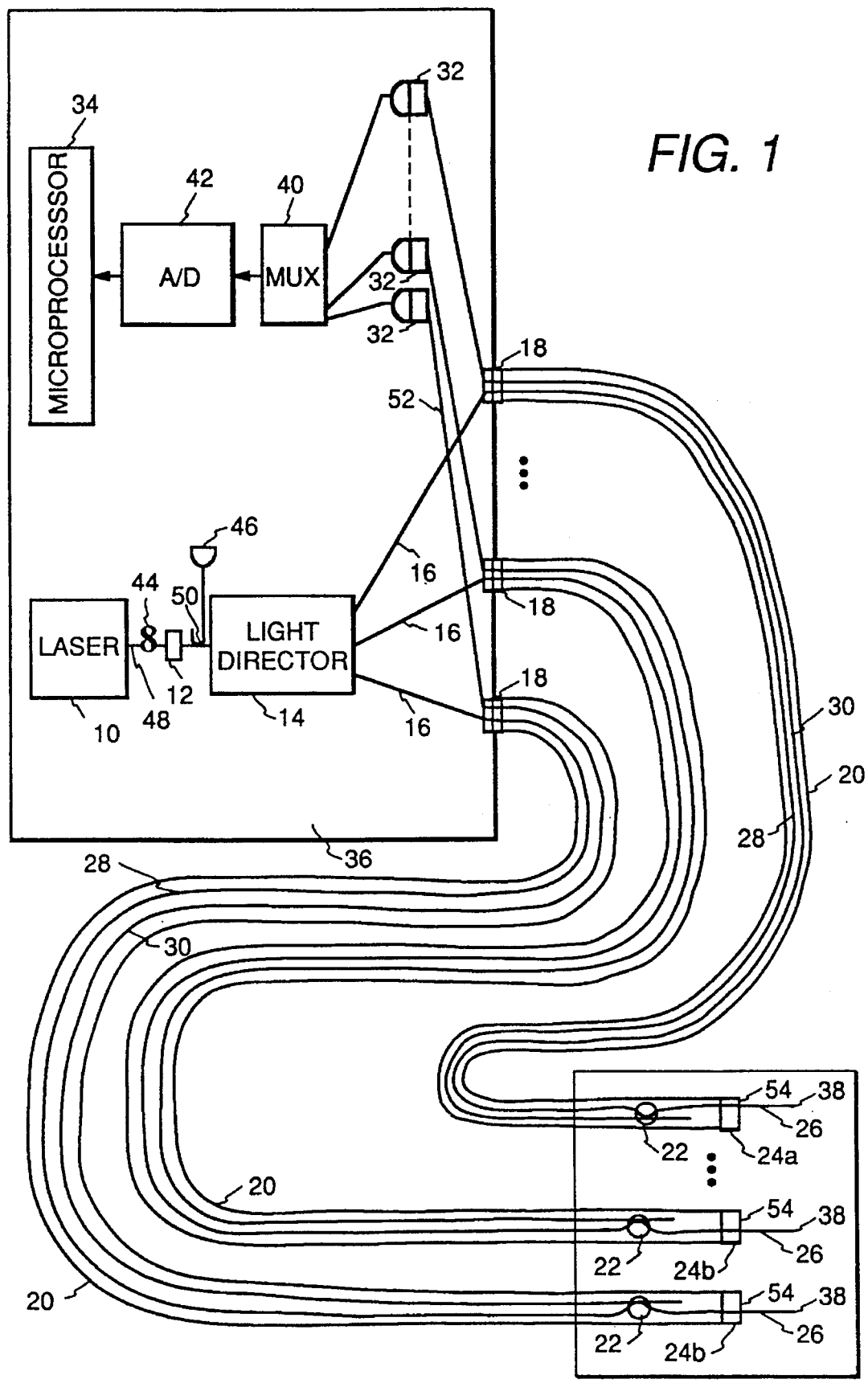
FIG. 1 is a schematic diagram of a system for remote fluorescent sensing with fiber optic probes in accordance with the invention.

FIG. 1 is a schematic diagram of one embodiment of the invention. A light source, shown as a laser 10, supplies excitation light (preferably coherent excitation light) for inducing fluorescence and may comprise, for example, either a pulsed laser or a continuous wave (CW) laser. In one embodiment. laser 10 is a diode pumped solid state frequency doubled Nd:YAG (neodymium doped yttrium aluminum garnet)laser. An isolator 12 is an optional feature of the invention which prevents light from entering the laser from the opposite direction. Preferably the laser has a fiber pigtail 48 (an attached length of fiber) so that lenses will not be needed to align the laser light with a fiber.

A chopper 44 is another optional feature of the invention which can be used with a CW laser. The chopper is used for improving rejection of stray light from outside the system. When a chopper (or a pulsed laser) is used, a lock-in-amplifier (not shown) is coupled to the chopper control (or pulsed laser) and tuned to measure the output of the detected signal only at the predetermined frequency of the chopper (or pulsed laser).

Preferably, a beam splitter 50 or directional coupler directs a predetermined amount of light to a laser power reference 46. These components are used because the signal from the analyte varies with laser power, requiring the laser to be monitored during operation. Some lasers have built-in power meters.

A light director 14, such as a star coupler or an optical switch, can be used to distribute a portion of the light from the laser into each of a number n of fibers 16. The term "portion" in this context means either a fraction of light that is directed to a particular probe simultaneously with other probes or the entire amount of light which is injected into a probe for a fraction of the detection period. These fibers 16 may comprise any suitable material, such as, for example, quartz or glass. If a star coupler is used, light is directed simultaneously into fibers 16, which are typically an attachment to the star coupler. If an optical switch rather than a star coupler is used, light can be injected into each fiber sequentially, thus permitting a laser with lower power to be used. Another option, which requires no light director, is to use n lasers, with each laser corresponding to a respective one of the fibers.

Each one of fibers 16 is coupled using a conventional fiber connector 18, respectively, to a corresponding excitation fiber 28 of a carrier cable 20. Each carrier cable 20 additionally includes a return fiber 30. A carrier cable need not have additional material; the carrier cable can comprise fibers 28 and 30 intertwined so that they remain together. Alternatively, material such as a plastic can surround the fibers. In one embodiment, excitation fiber 28 and return fiber 30 of any given cable 20 are connected using a directional coupler 22.

Either the excitation fiber or the return fiber is further coupled through a conventional connector 24a or 24b, respectively, to a fiber optic probe 26. In one embodiment, fiber optic probe 26 is an evanescent field laser induced fluorescence sensor (LIFS) probe of the type disclosed in commonly assigned Feldman et al., "Synthesis of Tapers for Fiber Optic Sensors," U.S. application Ser. No. 7/933,751, filed Dec. 21, 1992, which is herein incorporated by reference. Other examples of applicable probes include probes using a polymer coating to selectively absorb the analyte and probes using distally excited and detected fluorescence. One example of a non-fluorescent sensor probe which can be used with the present invention is a Raman sensor probe.

If the probe is a distal probe, the portion of the native fluorescence of the fiber which is induced by the excitation light travelling in the forward direction will travel to the solution being analyzed. A small amount might be scattered back into the probe, but most of the native fluorescence will dissipate in the solution. This dissipation is not harmful because native fluorescence will be the wrong wavelength to generate fluorescence from the analyte.

If fiber probe 26 is an evanescent probe, preferably the tip 38 of each such fiber optic probe has an absorbant material such as, for example, black epoxy coated thereon. This absorbant material is used for absorbing excitation light remaining in the probe as well as any forward travelling fluorescence created as the excitation light travels through fiber 16 and excitation fiber 28 of carrier cable 20.

A directional coupler 22 is designed so that an optimal fraction of the analyte fluorescence is passed through and guided into return fiber 30 towards detection subassembly 32. The directional coupler can be a simple directional coupler or, alternatively, the directional coupler can be a dichroic or wavelength division multiplexing coupler to provide initial filtering between any excitation light which may have been reflected by the probe and the detected fluorescent signal. Generally, a simple directional coupler will pass 50% of the light in either direction. A dichroic or wavelength division multiplexing coupler passes predetermined wavelengths, so a greater proportion of the desired light with predetermined wavelengths is passed in the appropriate direction than is passed in a simple 50% directional coupler.

Preferably, in each carrier cable 20, directional coupler 22 is positioned outside a housing 36 in which detection subassemblies are contained and near the end 54 (preferably less than 30 cm from the end) of the carrier cable which is closest to its respective probe 26, so that native fluorescence from the excitation fibers of the carrier cables is not coupled into the return fiber and does not reach the detection subassemblies. Typically no fluorescence is generated in the return fiber because no excitation light is guided through the return fiber. Because the invention offers better rejection of background fluorescence and thus yields lower noise than conventional single fiber techniques, improves potential signal-to-noise ratios from dilute analyte solutions, and reduces the need for precision detection techniques, the invention is also applicable to a single probe system with a directional coupler positioned near the fiber probe.

Fiber used for light director 14, excitation fiber 28, return fiber 30, and probe 26 is preferably multi-mode. Each fiber connector 18 is also used to couple a respective return fiber 30 to a respective fiber 52 for delivering the detected fluorescence to a respective detection subassembly 32. In a preferred embodiment fiber connectors 18 comprise duplex connectors or keyed single connectors to provide flexibility in carrier cable positioning while minimizing the chances of improperly connecting the carrier cable to the light director and detection subassemblies.

Figure 3:
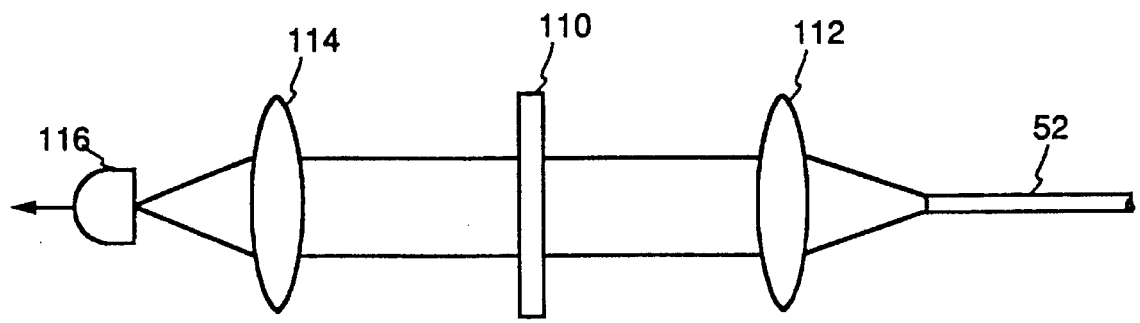
FIG. 3 is a schematic diagram of a detection subassembly which can be used with the invention.

As shown in FIG. 3, each detection subassembly preferably comprises a filter 110, such as a holographic edge filter, between a pair of collimating lenses 112 and 114, as well as a detector 116 such as a PIN photodiode, photomultiplier tube, or avalanche photodiode. The detected signals can then be multiplexed by a multiplexer 40, converted into digital form by an analog-to-digital converter 42, and sent to a microprocessor 34 for analysis.

The system can be used to simultaneously determine the concentrations of multiple analytes by appropriately designing each probe for detection of a specific analyte. This is accomplished, for example, by selecting an appropriate coating to cause a selected analyte to adhere to a particular probe.

Preferably, laser 10, light director 14, detection subassemblies 32, and microprocessor 34 are contained in housing 36 for ease of portability. Housing 36 can comprise any suitable structural material, such as, for example, metal or plastic, and preferably is optically opaque. If housing 36 is not opaque, then a shield (not shown) can be used to prevent light from reaching detection subassemblies 32 and fibers 52.

Figure 2:
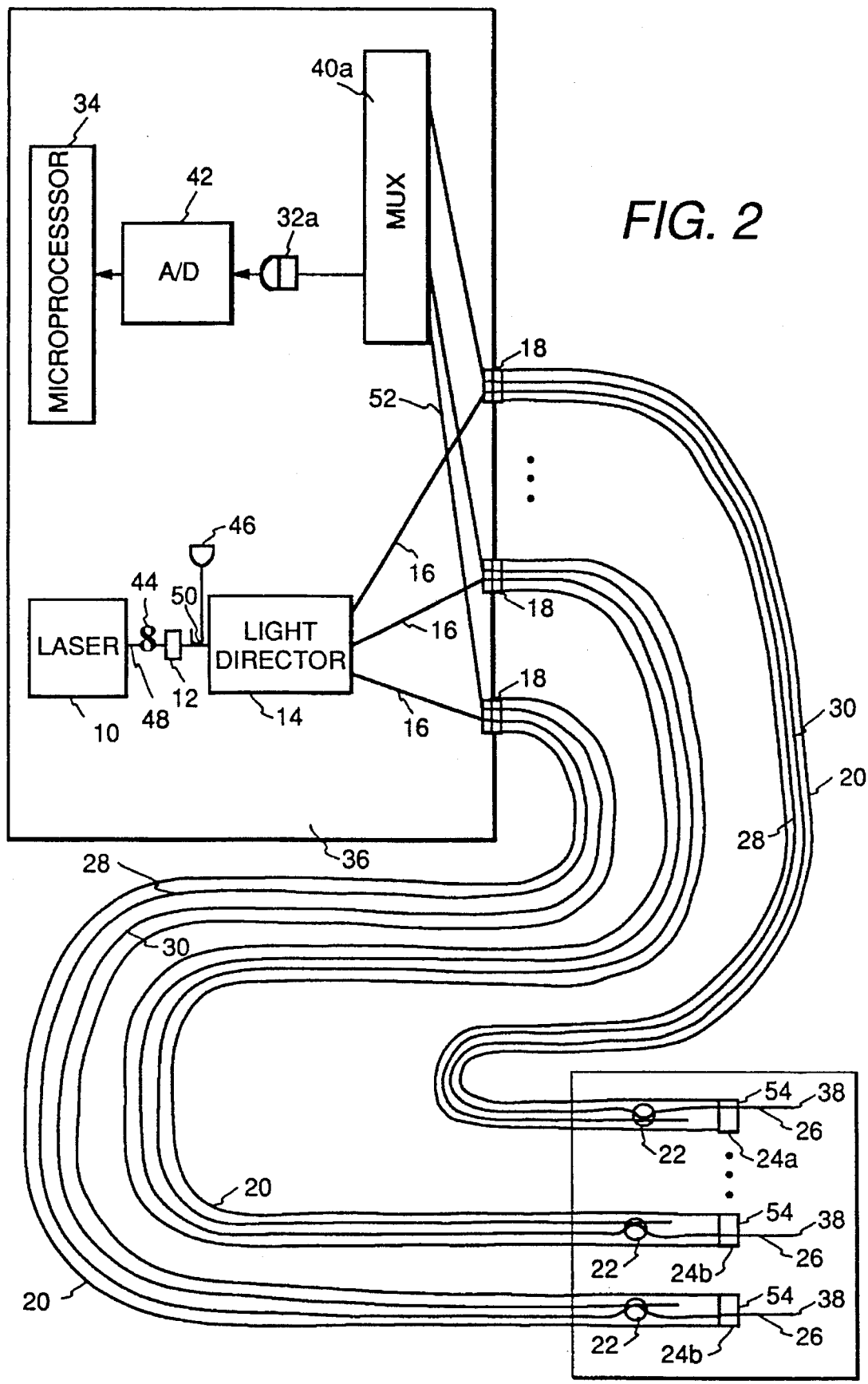
FIG. 2 is a schematic diagram of another system for remote fluorescent sensing with fiber optic probes in accordance with the invention.

FIG. 2 is a schematic diagram of another embodiment of the invention in which light director 14 comprises an optical switch, which provides sequential light distribution, rather than a star coupler or other component that simultaneously distributes light. Then, rather than connecting return fibers 30 to individual detectors 32 as in the embodiment of FIG. 1, the return fibers are connected to an optical multiplexer 40a, such as supplied by Fibersense & Signals, Inc., Concord, Ontario, Canada, which sends a multiplexed signal to a single detector 32a. The detected signal is then converted to digital form and sent to microprocessor 34.

Figure 4:
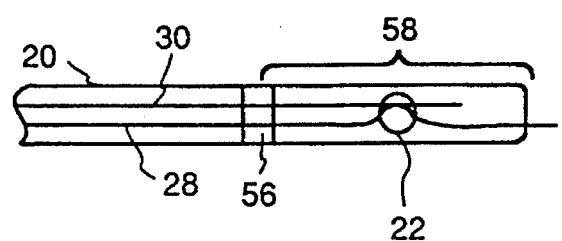
FIG. 4 is a schematic diagram of a probe which can be used with the invention.

Any of the connectors 24a or 24b between a carrier cable 20 and its associated probe 26 are likely to introduce crosstalk between excitation fiber 28 and return fiber 30 of the specific carrier cable unless the connector has extremely low back-reflectance. The need for a low back-reflectance connector or index matching fluid can be eliminated by making directional coupler 22 part of a fiber optic probe 58, as shown in FIG. 4, which is connected to carrier cable 20 with a connector 56.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A fiber optic probe system for remote fluorescence sensing, the system comprising:

a fiber optic probe;

an excitation fiber for receiving excitation light and acting as a single source of said excitation light for said fiber optic probe;

a detection subassembly;

a return fiber for receiving detected light from said probe and acting as a single source of the detected light for said detection subassembly; and a directional coupler coupling said excitation fiber with said return fiber, said directional coupler being situated near the ends of said excitation and return fibers which are sufficiently close to said fiber optic probe to prevent native fluorescence from said excitation of fiber from being coupled into said return fiber and reaching said detection subassembly, said directional coupler comprising, a coupler selected from the group consisting of dichroic and wavelength division multiplexing couplers for passing a greater proportion of the excitation light with predetermined excitation wavelengts towards said fiber optic probe and passing a greater proportion of the detected light with predetermined detection wavelengths towards said detection subassembly.

2. The system of claim 1, wherein said detection subassembly comprises a pair of collimating lenses, a filter between said pair of collimating lenses, and a photodetector.

3. The system of claim 1, further including a light source for providing said excitation light, said light source comprising a light source selected from the group consisting of pulsed lasers or continuous wave lasers.

4. The system of claim 3, further including a housing surrounding said light source and said detection subassembly, said directional coupler being situated outside of said housing.

5. A fiber optic probe system for remote fluorescence sensing, the system comprising:

a fiber optic probe including a directional coupler;

an excitation fiber for receiving excitation light and acting as a single source of said excitation light for said fiber optic probe;

a detection subassembly;

a return fiber for receiving detected light from said probe and acting as a single source of the detected light for said detection subassembly, the directional coupler being situated near the ends of said excitation and return fibers which are sufficiently close to said fiber optic probe to prevent native fluorescence from said excitation fiber from being coupled into said return fiber and reaching said detection subassembly, the directional coupler comprising a coupler selected from the group consisting of dichroic and wavelength division multiplexing couplers for passing a greater proportion of the excitation light with predetermined excitation wavelengths through said fiber optic probe and passing a greater proportion of the detected light with predetermined detection wavelengths towards said detection subassembly; and a connector for connecting said excitation and return fibers to said fiber optic probe.

6. A system for multiplexing fiber optic probes for remote fluorescence sensing, the system comprising:

a plurality of fiber optic probes;

a plurality of excitation fibers for receiving excitation light, each one of said plurality of excitation fibers acting as a single respective source of said excitation light for a respective one of said plurality of fiber optic probes;

a detection subassembly;

a plurality of return fibers for receiving detected light, each respective one of said plurality of return fibers acting as a single respective source of a respective portion of the detected light for said detection subassembly; and a plurality of directional couplers, each of said plurality of directional couplers coupling a respective one of said plurality of excitation fibers with a respective one of said plurality of return fibers and being situated near the ends of said respective one of said plurality of excitation fibers and said respective one of said plurality of return fibers which are sufficiently close to a respective one of said plurality of fiber optic probes to prevent native fluorescence from said respective one of said plurality of excitation fibers from being coupled into said respective one of said plurality of return fibers and reaching said detection subassembly, each of said plurality of directional couplers comprising a coupler selected from the group consisting of dichroic and wavelength division multiplexing couplers for passing a greater proportion of the excitation light with predetermined excitation wavelengths towards a respective one of said plurality of fiber optic probes and passing a greater proportion of the detected light with predetermined detection wavelengths towards said detection subassembly.

7. The system of claim 6, further including means for directing said excitation light to each one of said plurality of excitation fibers.

8. The system of claim 7, further including a light source for providing said excitation light, said light source comprising a light source selected from the group consisting of pulsed lasers or continuous wave lasers.

9. The system of claim 8, wherein said directing means is selected from the group consisting of a star coupler or an optical switching device.

10. The system of claim 7, further including a plurality of detection subassemblies, each one of said detection subassemblies coupled to a respective one of said plurality of return fibers.

11. The system of claim 10, wherein each one of said detection subassemblies comprises a pair of collimating lenses, a filter between said pair of collimating lenses, and a photodetector.

12. The system of claim 11, wherein said photodetector comprises a photodiode.

13. The system of claim 10, further including a light source for providing said excitation light and a housing surrounding said light source, said directing means, and said plurality of detection subassemblies, said directional coupler being situated outside of said housing.

14. The system of claim 7, further including:

an optical multiplexer, each one of said return fibers being coupled to said optical multiplexer, said optical multiplexer being coupled to the detection subassembly.

15. A method for detecting a plurality of analytes by remote fluorescence sensing, the method comprising the steps of:

providing excitation light in a plurality of excitation fibers;

directionally coupling said excitation light in said plurality of excitation fibers into a plurality of fiber optic probes situated in a fluid to be tested, each of said excitation fibers acting as a single respective source of a respective portion of said excitation light for a respective one of said plurality of fiber optic probes;

detecting fluorescence in said fluid with said plurality of fiber optic probes; and directionally coupling the detected fluorescence from said plurality of fiber optic probes to a plurality of respective return fibers, each one of said plurality of respective return fibers coupled to a respective one of said plurality of fiber optic probes and acting as a single respective source of a respective portion of the detected fluorescence to a detection subassembly;

wherein the steps of directionally coupling said excitation light and directionally coupling the detected fluorescence comprise using a plurality of directional couplers, each respective one of said plurality of directional couplers being situated near the ends of a respective one of said plurality of excitation fibers and a respective one of said plurality of return fibers which are sufficiently close to a respective one of said fiber optic probes to prevent native fluorescence from respective one of said plurality of excitation fibers from being coupled into said respective one of said plurality of return fibers and reaching said detection subassembly, each of said plurality of directional couplers comprising a coupler selected from the group consisting of dichroic and wavelength division multiplexing couplers for passing a greater proportion of the excitation light with predetermined excitation wavelengths towards a respective one of said plurality of fiber optic probes and passing a greater proportion of the detected light with predetermined detection wavelengths towards said detection subassembly.

16. The method of claim 15, wherein the step of providing said excitation light comprises directing excitation light from a single source to each of said plurality of excitation fibers.

17. The method of claim 16, wherein the step of providing said excitation light comprises simultaneously providing said excitation light to each of said plurality of excitation fibers.

18. The method of claim 16, wherein the step of providing said excitation light comprises sequentially providing said excitation light into each of said plurality of excitation fibers.

* * * * *